(12) United States Patent
Karaoguz et al.

(10) Patent No.: US 7,433,650 B2
(45) Date of Patent: Oct. 7, 2008

(54) METHOD OF CREATING INCENTIVES FOR ESTABLISHING HOTSPOT LOCATIONS

(75) Inventors: Jeyhan Karaoguz, Irvine, CA (US); Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 69 days.

(21) Appl. No.: 11/513,092

(22) Filed: Aug. 31, 2006

(65) Prior Publication Data

US 2007/0121838 A1 May 31, 2007

Related U.S. Application Data

(63) Continuation of application No. 10/916,402, filed on Aug. 12, 2004, now Pat. No. 7,120,420, which is a continuation of application No. 10/315,145, filed on Dec. 10, 2002, now Pat. No. 6,795,700.

(60) Provisional application No. 60/409,936, filed on Sep. 12, 2002.

(51) Int. Cl.
*H04B 7/00* (2006.01)
(52) U.S. Cl. .............. 455/41.2; 455/408; 370/468
(58) Field of Classification Search ............ 455/3.04, 455/405–408, 411, 414.1, 422.1, 426.1–2, 455/432.2, 435.1, 436; 379/112.01, 112.06, 379/114.03, 114.05
See application file for complete search history.

(56) References Cited

U.S. PATENT DOCUMENTS

| | | | |
|---|---|---|---|
| 6,535,726 B1 | 3/2003 | Johnson | |
| 2002/0191575 A1 | 12/2002 | Kalavade et al. | |
| 2003/0051041 A1 | 3/2003 | Kalavade et al. | |
| 2003/0182431 A1 | 9/2003 | Sturniolo et al. | |
| 2004/0052223 A1 | 3/2004 | Karaoguz et al. | |
| 2004/0053609 A1 | 3/2004 | Karaoguz et al. | |
| 2004/0053613 A1 | 3/2004 | Karaoguz et al. | |
| 2004/0077336 A1 | 4/2004 | Lauriol | |

OTHER PUBLICATIONS

"IEEE 802.11, A Technical Overview," Pablo Brenner, BreezeNet website, Jul. 8, 1997, www.sss-mag.com/pdf/80211p.pdf.
Donny Jackson, Telephony, Ultrawideband May Thwart 802.11, Bluetooth Efforts, PRIMEDIA Business Magazines & Media Inc., Feb. 11, 2002.
Daniel L. Lough, et al., "A Short Tutorial on Wireless LANs and IEEE 802.11," The IEEE Computer Society's Student Newsletter, Virginia Polytechnic Institute and State University, Summer 1997, vol. 5, No. 2.
Dr. Robert J. Fontana, "A Brief History of UWB Communications," Multispectral.com, Multispectral Solutions, Inc., www.multispectral.com/history.html, Aug. 20, 2002.
Gerald F. Ross, "Early Motivations and History of Ultra Wideband Technology," Anro Engineering, Inc., Multispectral.com, Multispectral Solutions, Inc., www.multispectral.com/history.html, Aug. 20, 2002.

(Continued)

*Primary Examiner*—Binh K Tieu
(74) *Attorney, Agent, or Firm*—Squire, Sanders & Dempsey, LLP

(57) ABSTRACT

A process of creating incentives for wireless hotspots by a service provider is disclosed. An access point is provided to a wireless hotspot for wireless devices to wirelessly connect to a larger network in a publicly accessible location. Use of the access point for a portable device is authenticated by requesting submission of an account identifier to the service provider and billing data for a user of the portable device for use of the access point is generated. Use statistics are evaluated of the access point of the wireless hotspot by portables devices and an inducement is provided to the publicly accessible location based on the evaluated use statistics.

25 Claims, 6 Drawing Sheets

OTHER PUBLICATIONS

Dr. Terence W. Barrett, "History of Ultra Wideband (UWB) Radar & Communications: Pioneers and Innovators," Proceedings and Progress in Electromagnetics Symposium 2000 (PIERS2000), Cambridge, MA, Jul. 2000.

Dr. Henning F. Harmuth, "An Early History of Nonsinusoidal Electromagnetic Technologies," Multispectral.com, Multispectral Solutions, Inc., www.multispectral.com/history.html, Aug. 20, 2002.

Rebecca Taylor, "Hello, 802.11b and Bluetooth: Let's Not Be Stupid!", ImpartTech.com, www.ImportTech.com/802.11-bluetooth.htm, Aug. 21, 2002.

Matthew Peretz, "802.11, Bluetooth Will Co-Exist: Study," 802.11-Planet.com, INT Media Group, Inc., Oct. 30, 2001.

"Bluetooth and 802.11: A Tale of Two Technologies," 10Meters.com, www.10meters.com/blue_802.html, Dec. 2, 2000.

Keith Shaw, "Bluetooth and Wi-Fi: Friends or foes?", Network World Mobile Newsletter, Network World, Inc., Jun. 18, 2001.

Joel Conover, "Anatomy of IEEE 802.11b Wireless," NetworkComputing.com, Aug. 7, 2000.

Bob Brewin, "Intel, IBM Push for Public Wireless LAN," Computerworld.com, Computerworld Inc., Jul. 22, 2002.

Ernest Khoo, "A CNET tutorial: What is GPRS?", CNETAsia, CNET Networks, Inc., Feb. 7, 2002.

Les Freed, "Et Tu, Bluetooth?", ExtremeTech.com, Ziff Davis Media Inc., Jun. 25, 2001.

Bluetooth & 802.11b—Part 1, www.wilcoxonwireless.com/whitepapers/bluetoothvs802.doc, Jan. 2002.

Bob Brewin, "Report: IBM, Intel, Cell Companies Eye National Wi-Fi Net," Computerworld.com, Computerworld Inc., Jul. 16, 2002.

Bob Brewin, "Microsoft Plans Foray Into Home WLAN Device Market," Computerworld.com, Computerworld Inc., Jul. 22, 2002.

Bob Brewin, "Vendors Field New Wireless LAN Security Products," Computerworld.com, Computerworld Inc., Jul. 22, 2002.

Jeff Tyson, "How Wireless Networking Works," Howstuffworks.com, Howstuffworks, Inc., www.howstuffworks.com/wireless-network.htm/printable, Aug. 15, 2002.

Curt Franklin, "How Bluetooth Works," Howstuffworks.com, Howstuffworks, Inc., www.howstuffworks.com/bluetooth.htm/printable, Aug. 15, 2002.

802.11b Networking News, News for Aug. 19, 2002 through Aug. 11, 2002, 802.11b.weblogger.com/, Aug. 11-19, 2002.

"Wireless Ethernet Networking with 802.11b, An Overview," HomeNetHelp.com, Anomaly, Inc., www.homenethelp.com/80211.b/index.asp, Aug. 20, 2002.

"Simple 802.11b Wireless Ethernet Network with an Access Point," HomeNetHelp.com, Anomaly, Inc., www.homenethelp.com/web/diagram/access-point.asp, Aug. 20, 2002.

"Simple 802.11b Wireless Ethernet Network without an Access Point," HomeNetHelp.com, Anomaly, Inc., www.homenethelp.com/web/diagram/ad-hoc.asp, Aug. 20, 2002.

"Cable/DSL Router with Wired and Wireless Ethernet Built In," HomeNetHelp.com, Anomaly, Inc., www.homenethelp.com/web/diagram/share-router-wireless.asp, Aug. 20, 2002.

"Bridging a Wireless 802.11b Network with a Wired Ethernet Network" HomeNetHelp.com, Anomaly, Inc., www.homenethelp.com/web/diagram/wireless-bridged.asp, Aug. 20, 2002.

"Wireless Access Point (802.11b) of the Router Variety," HomeNetHelp.com, Anomaly, Inc., www.homenethelp.com/web/diagram/share-wireless-ap.asp, Aug. 20, 2002.

Robert Poe, "Super-Max-Extra-Ultra-Wideband!", Business2.com, Oct. 10, 2000.

David G. Leeper, "Wireless Data Blaster," ScientificAmerican.com, Scientific American, Inc., May 4, 2002.

Steven J. Vaughan-Nichols, "Ultrawideband Wants to Rule Wireless Networking," TechUpdate ZDNet.com, Oct. 30, 2001.

Jim Zyren and Al Petrick, "Brief Tutorial on IEEE 802.11 Wireless LANs," AN9829, Intersil Corporation, Feb. 1999.

"Overview of UWB?", PulseLink.net, Pulse~Link, Inc., www.pulselink.net/ov_history.html. Sep. 4, 2002.

Robert X. Cringely, "The 100 Mile-Per-Gallon Carburetor—How Ultra Wide Band May (or May Not) Change the World," InterestingPeople.org, Jan. 26, 2002.

William A. Kissick, Editor, "The Temporal and Spectral Characteristics of Ultrawideband Signals," NTIA Report 01-383, Jan. 2001, www.its.bldrdoc.gov/pub/ntia-rpt/01-383/.

"Ultra Wide Band," www.ida.gov.sg/Website/IDAContent.nsf/dd1521fle79ecf3bc825682f0045a349/1856626048baf403c82569-880267e26%3FOpenDocument+%22Full+duplex+UWB+hand-heldtransceiver%22&hl=en&ie=UTF-8, Aug. 20, 2002.

METHOD OF CREATING INCENTIVES FOR ESTABLISHING HOTSPOT LOCATIONS

REFERENCE TO RELATED APPLICATIONS

This application is a continuation of U.S. patent application Ser. No. 10/916,402, filed on Aug. 12, 2004, which claims priority of U.S. patent application Ser. No. 10/315,145, filed on Dec. 10, 2002 which claims priority of U.S. Provisional Patent Application Ser. No. 60/409,936, filed on Sep. 12, 2002. The subject matter of this earlier filed application is hereby incorporated by reference.

BACKGROUND OF THE INVENTION

1. Field of Invention

The present invention relates to devices and networks that utilize wireless computer networks and methods of creating incentives for establishment and continued operation of wireless computer networks. The present invention further relates to methods and networks that allow for proper for users to access wireless services from wireless hotspots without requiring an account with each wireless hotspot location. Additionally, the present invention also provides incentives to rapidly expand the growth of wireless services to create an economic base of wireless services users and wireless hotspots locations.

2. Description of Related Art

The emergence of what are commonly called wireless hotspots has increased the mobility of wireless users and allowed mobile users to access network resources without requiring a physical connection to the large network. Many of these wireless hotspots have appeared in coffee shops and libraries, and allow users with wireless communication equipment to communicate with local area networks and wide area networks as they move about. The locations that provide the access do so to attract customers or because, in the case of libraries, they see such access as an extension of their governmental mandate. However, the equipment, monitoring and access services are not free, and the provider of the hotspot has to bear the burden of those expenses. As an example, a T-1 digital connection can cost approximately $1000 per month in 2002 rates to provide such a level of service. If the expansion of wireless hotspots is to continue so that they become ubiquitous, one possibility is for the persons using the hotspots should take up some portion of the costs.

In addition, there is also a "chicken or the egg" type problem with wireless access. Since the relative number of users of wireless devices in 2002 is not high, establishments do not generally have any incentive to provide wireless service for a small number of users. Similarly, while the number of establishments offering wireless services is small, users of the wireless devices don't not generally have any incentive to sign up for those services if they are available in only a few places. One of the benefits of having consumers pay for the access services, is that this would allow for the party receiving payments to create incentives to expand wireless access and thus increase the amount of payments received by the party receiving payments.

As such, there is a need for a method or mechanism that can create incentives for wireless devices and wireless hotspots to spread the use of wireless access. In addition, there is also a need for a system and method that can monitor the use of existing services offered by wireless hotspot to wireless devices and provide incentives to expand the existing services based on use.

SUMMARY OF THE INVENTION

It is an object of this invention to overcome the drawbacks of the above-described conventional network devices and methods. The present invention is directed to software applications and systems that allow for controls to be placed on the type and amount of data received and sent based on access criteria. Those controls are important in that they allow the end user or the device to control the amount of data received from or sent to the wireless network that the system will process and display.

According to one aspect of this invention, a process of creating incentives for wireless hotspots by a service provider is disclosed. An access point is provided to a wireless hotspot for wireless devices to wirelessly connect to a larger network in a non-private location. Use of the access point for a portable device is authenticated by requiring submission of an account identifier to the service provider and a user of the portable device is billed for use of the access point. Use statistics are evaluated of the access point of the wireless hotspot by portables devices and an inducement is provided to the non-private location based on the evaluated use statistics.

Alternatively, the use statistics may be the number of users of the access point of the wireless hotspot or the types of services utilized by users of the access point of the wireless hotspot. Also, the authentication of use of the access point for a portable device may be through requiring submission of an account identifier to one of a wireless telephone service provider and a landline telephone service provider. The inducements may include providing a proprietor of the wireless hotspot with a portion of revenue received by the service provider based on the step of billing a user of the portable device for use of the access point. The inducements may also include providing subsidized access to the access point of the wireless hotspot for certain users affiliated with the wireless hotspot.

The process may include advertising services available from the wireless hotspot to users of the access point of the wireless hotspot, where the advertisement may be made through the access point to users of the access point of the wireless hotspot or through a wireless telephone network. Additionally, the inducement may include upgrading equipment utilized by the access point, where enhanced equipment may be provided to the wireless hotspot to provide greater bandwidth access to portable devices accessing the access point. Also, the inducement may include providing specialized content to the wireless hotspot.

According to another embodiment of the invention, a system for monitoring of wireless hotspots and creating incentives for wireless hotspots by a service provider is disclosed. The system includes first providing means for providing an access point to a wireless hotspot for wireless devices to wirelessly connect to a larger network in a non-private location and authenticating means for authenticating use of the access point for a portable device by requiring submission of an account identifier to the service provider. The system further includes billing means for billing a user of the portable device for use of the access point, evaluating means for evaluating the use statistics of the access point of the wireless hotspot by portable devices and second providing means for providing an inducement to the non-private location based on the evaluated use statistics.

In another embodiment, a system for monitoring of wireless hotspots and creating incentives for wireless hotspots by a service provider is disclosed. The system includes a first provider for providing an access point to a wireless hotspot for wireless devices to wirelessly connect to a larger network in a non-private location and an authenticator for authenticating use of the access point for a portable device by requiring submission of an account identifier to the service provider. The system also includes an accounting system for billing a user of the portable device for use of the access point, an evaluator for evaluating the use statistics of the access point of the wireless hotspot by portables devices and a second provider for providing an inducement to the non-private location based on the evaluated use statistics.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

The present invention provides a system and a method for creating incentives to establish hotspot locations. Part of the incentive system allows users of the wireless hotspot to provide identifying information and be billed later for their usage. In one embodiment, the user could supply a wireless or landline telephone number and the user's account with the wireless telephone service provider would be billed. The present invention allows for wireless or landline telephone service providers or third party service providers to provide wireless hotspot equipment and service to locations to increase the use of their services and increase their profits through billing of users.

The process of creating incentives for wireless access may be carried out by different candidates that seek to benefit form the expansion of wireless services. One candidate for offering these services is landline telephone and wireless telephone providers, where those providers already provide landline, cellular and other wireless telephone data services to their users. Following a similar model as that used for mobile telephones, access to wireless hotspots can be coordinated through wireless telephone service providers, with the wireless telephone service providers assisting in authenticating of users, monitoring of usage and billing of users for usage.

Another candidate for offering wireless hotspot services would be a third party that supplies services to the wireless hotspot locations, provides authentication of users and processes and forwards billing information to billing party. Thus, the third party would provide the interface between the hotspots and an entity with which the user of the hotspot has an account. The third party could be a telephone company or a wireless telephone company or another service provider.

Figure 1:
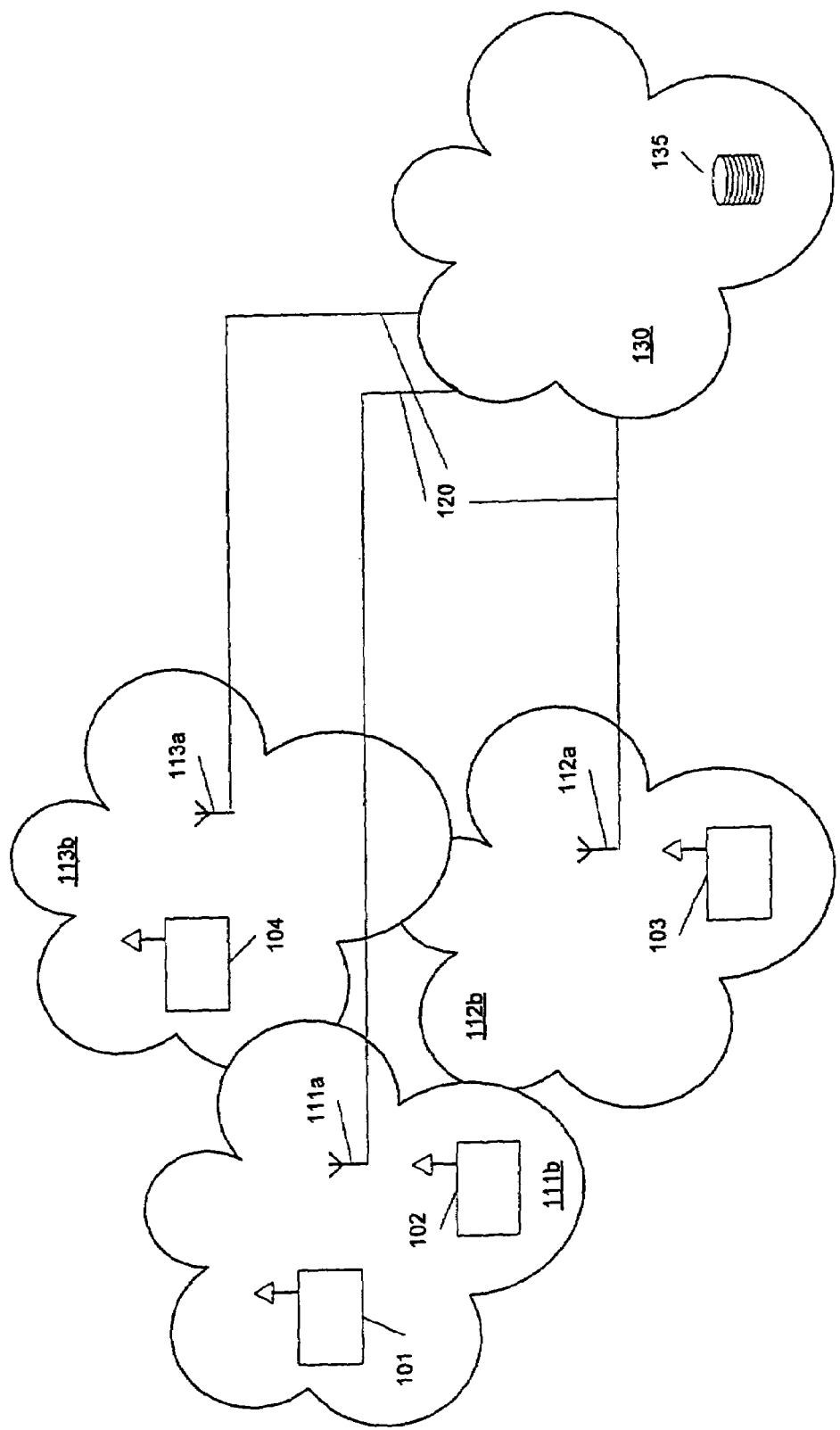
FIG. 1 is a schematic representation of a wireless telephone system having multiple cells, according to one embodiment of the present invention.

A general cellular telephone network is illustrated in FIG. 1. Multiple cells 111*b*, 112*b* and 113*b* are established through the use of antennas 111*a*, 112*a* and 113*a*. Devices 101-104 having access to the cellular telephone network are able to move from cell to cell and maintain access with the network. Each antenna 111*a*-113*a* can be connected through link 120 with a service provider 130. The service provider 130 controls access to the network and coordinates the handing-off of access as the devices pass between the cells. The service provider identifies each device and routes communication to the proper location of the particular device. The devices 101-104 may be cellular telephones, computers with wireless modems, or other devices that exchange information with the service provider.

Figure 2:
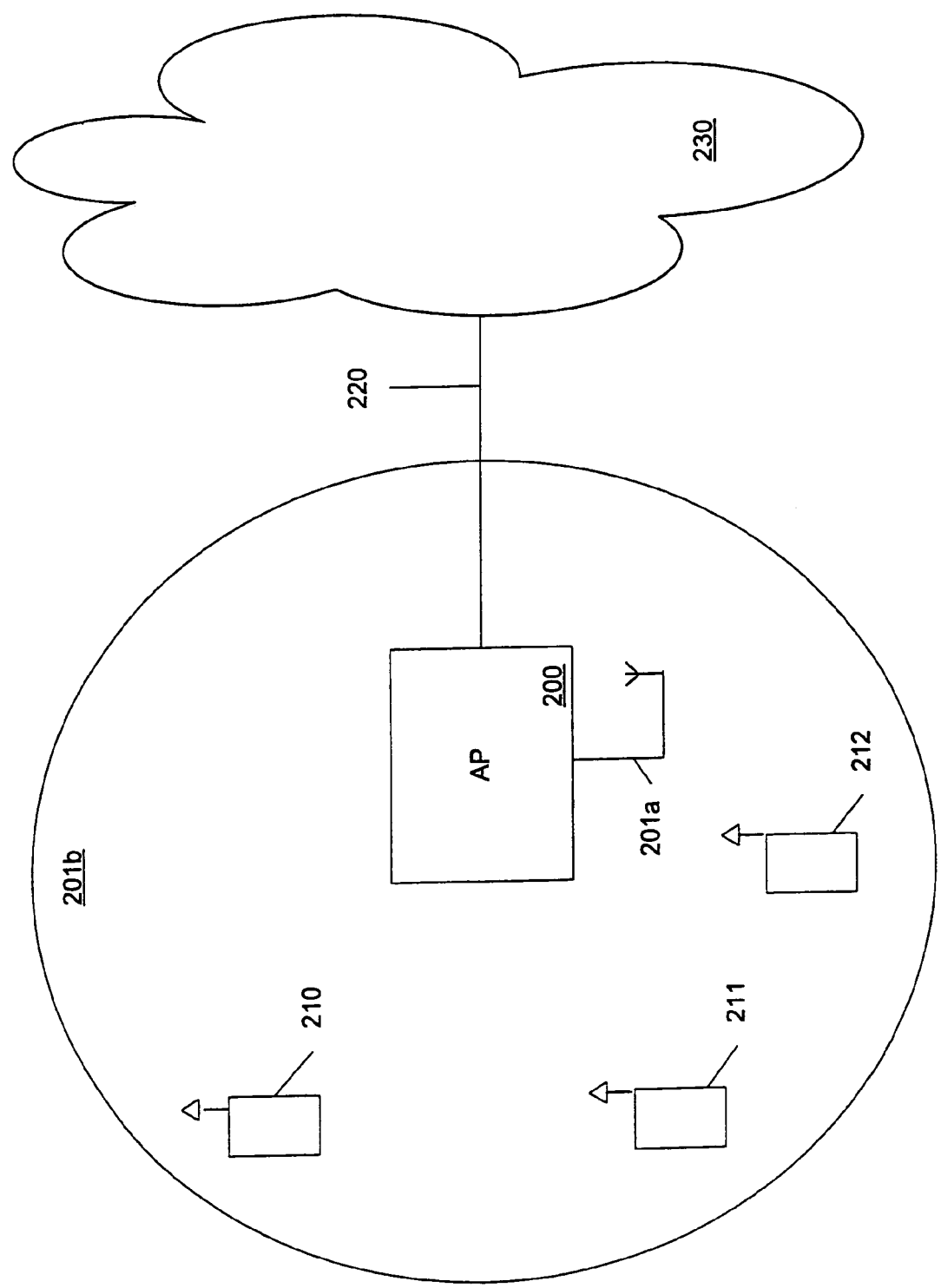
FIG. 2 illustrates a schematic representation of a wireless hotspot with an access point and several wireless devices, according to one embodiment of the present invention.

A general wireless hotspot installation is illustrated in FIG. 2. The hotspot is controlled through an access point 200, with the access point having an antenna 201*a* to establish a wireless access zone 201*b*. The wireless access may be made through an IEEE 802.11 standard local area network (LAN) or other type of wireless network. Devices 210-212 within the hotspot are able to communicate with the larger network 230 through communication with the access point 200. The access point 200 has a communication link 220 with the larger network 230 and the access point acts to enable communication between the devices 210-212 and the larger network and between the devices. As examples, the devices 210-212 may be computers equipped with 802.11 access cards, personal data assistants enabled for wireless access, cellular telephones having multiple means for wireless access or comparable devices. The larger network may be the Internet or some private wide area network.

Figure 3:
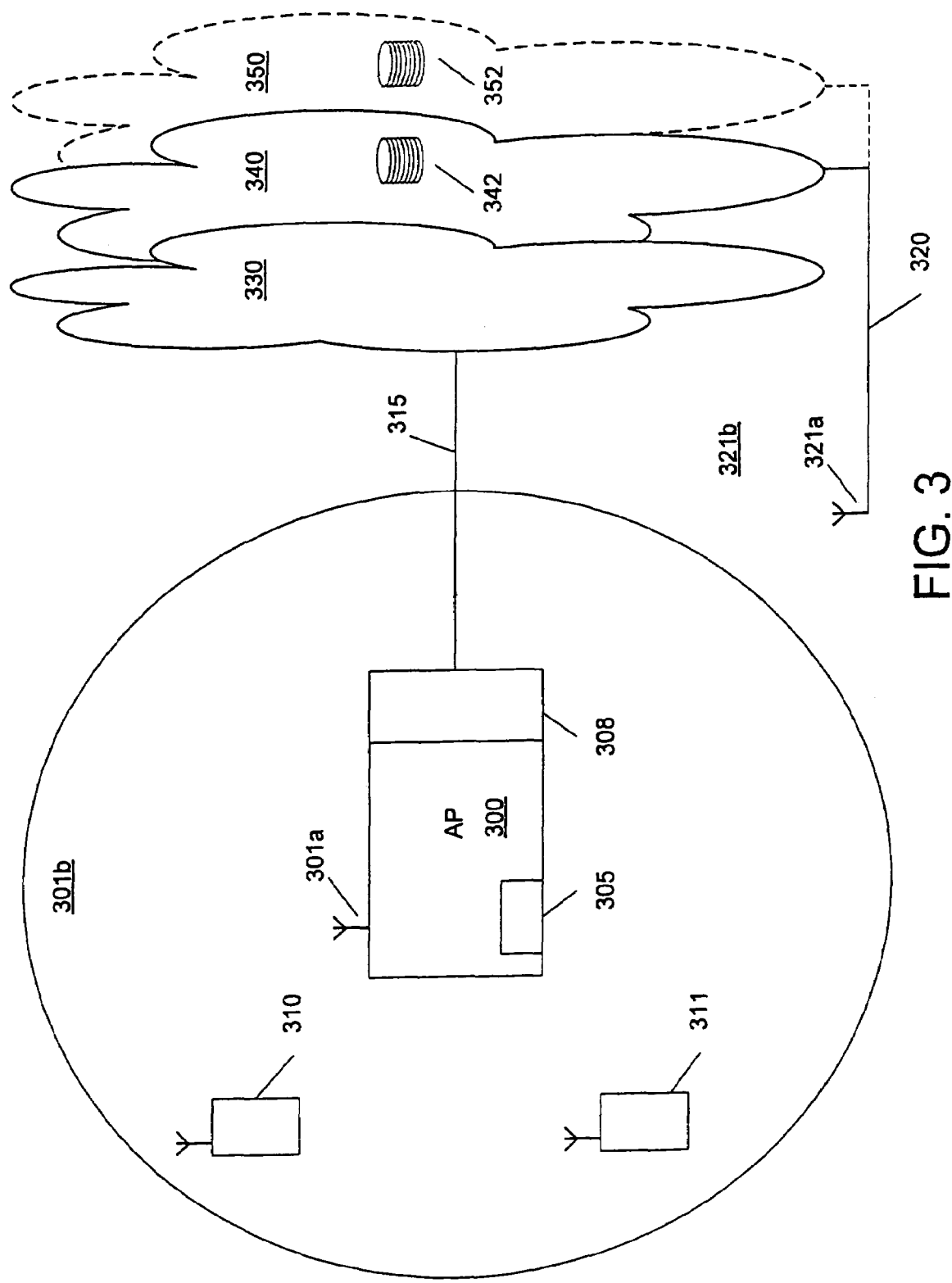
FIG. 3 illustrates a schematic of a wireless hotspot with connections to different network entities, according to an embodiment of the present invention.

FIG. 3 illustrates one embodiment of the present invention. A wireless hotspot is illustrated, with the coverage of the hotspot set by the access point 300 through an antenna 301*a*, the range of the hotspot is illustrated by the range 301*b*. Devices 310 and 311 within the range 301*b* may potentially establish a connection with the hotspot. The access to the access point is controlled through the access controller 305, that may be hardware, firmware, software or a combination thereof. A communication connection 315 is established between the access point 300 and the larger network 330 where that connection is modulated by a router 308.

Also illustrated in FIG. 3 is a wireless or landline telephone service provider 340. The service provider 340 contains a database 342 of users of the telephone network. The wireless or landline telephone service provider provides services through an antenna 321*a*, through a connection 320, to provide a coverage area 321*b*. The coverage area 321*b* for the wireless telephone service may also include some or all of the wireless hotspot range 301*b*.

Figure 4:
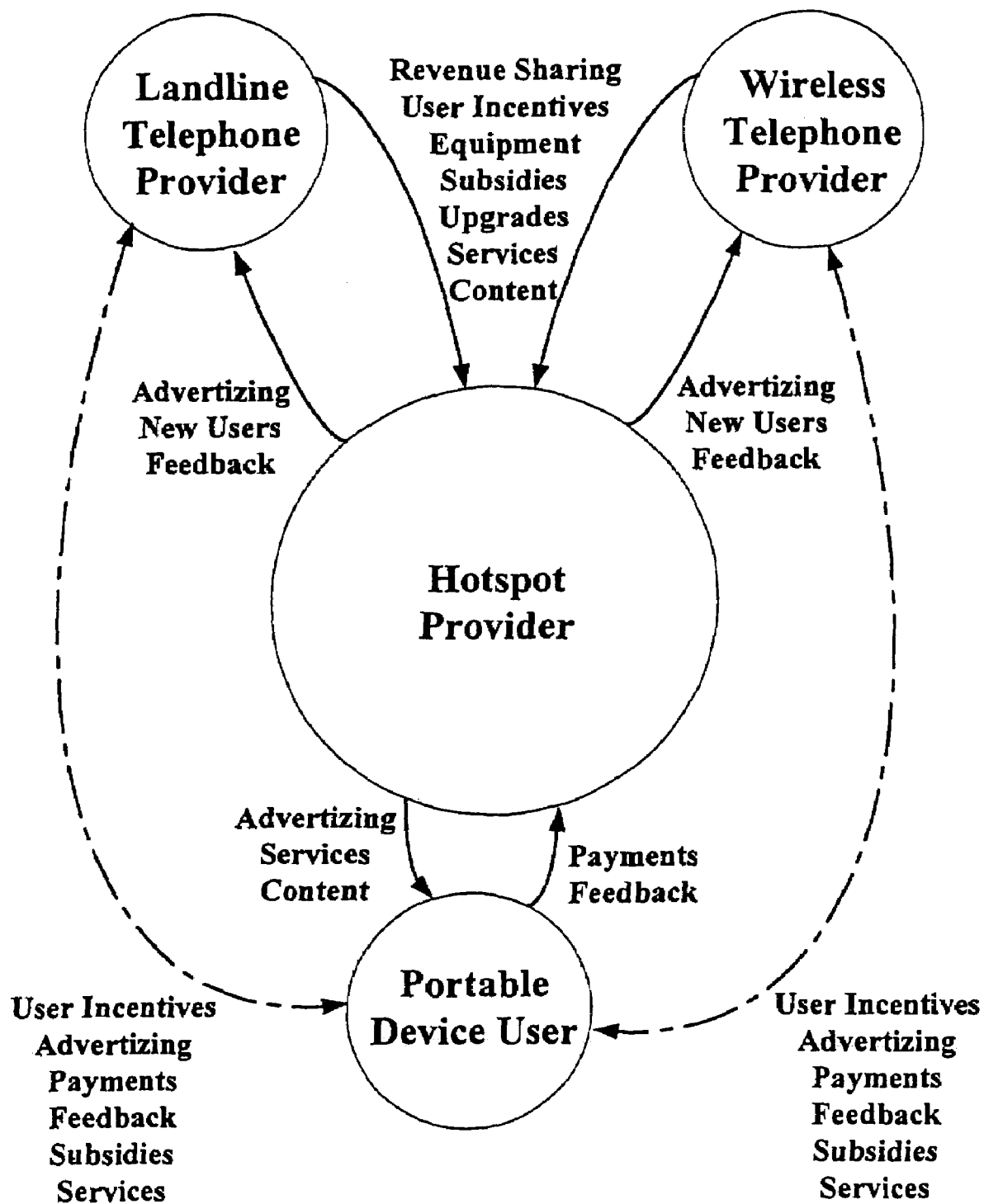
FIG. 4 provides a schematic representation of the good and services exchanged to provide incentives for wireless access.

FIG. 4 provides a schematic view of the goods, services and information exchanged between parties in order to create incentives. The wireless hotspot provider provides services to the portable device user, such as network access to a larger network, be it the Internet or a private intranet. The hotspot provider acts as a conduit for the portable device user to the larger network, and can also provide content that is specific to the hotspot. The latter type of content data may be menu items if the hotspot proprietor provides food or drink or may be information about access to a color printer if the hotspot provides access to such a color printer. The hotspot provider also can provide advertising for available services, advertising ads for sponsors of the hotspot, or advertising of other entities that have contracted to advertising served to users. In terms of goods, services and information provided by the portable device provides payments to the hotspot. That payment can be direct payment for services, a portion of payments received through revue sharing and increased sales revenue because of additional customers brought in through the offering of wireless services. Additionally, the portable device user may provide feedback to the hotspot provider. Such feedback may assist the hotspot provider and other entities to tailor their services to specific types of users that are desired.

Also, in FIG. 4, the hotspot provider also interacts with either a wireless telephone provider or a landline telephone provider. In the case of either entity, the hotspot provider provides feedback about the amount and types of services that are being used by portable device user. Such feedback is important because it allows the telephone provider to determine if services to the hotspot provider should be expanded, decreased or maintain at a present level. The hotspot provider also provides information about new users that may sign up for services through the hotspot. In addition, the hotspot provider also provides advertising data to the wireless or landline telephone provider, so that updated information about the capabilities of the hotspot can be advertised to the portable device users, as discussed below.

FIG. 4 also shows the goods, services and information provided to the hotspot provider from the wireless or landline telephone provider. A first incentive that may be provided to the hotspots would be equipment. Such equipment may be provided to the hotspot with, for example, the proviso that services be provided through the telephone provider. In that case, the hotspot provider would be able to offer services and not required to front the expenses for the wireless access equipment. As part of that arrangement, the telephone provider may also provide network services to the hotspot and can also provide content to the hotspot. Such content may be specific to the hotspot, such that only certain types of hotspot may carry specific content, e.g. a network gaming environment may only be provided to a specific coffee shop locations to provide an extra incentive to visit those locations.

Additionally, subsidies may also be provided to the hotspot provider. These subsidies may be in the form of reduced cost access to network services for the hotspot proprietor and their employees. The subsidies could also be in the form of a rebate for extra equipment installed in a hotspot provider. The telephone provider may also provide upgrades to the services and/or equipment of the hotspot based on the usage of the hotspot or other criteria. Also, the telephone provider and the hotspot provider may engage in a revenue sharing agreement between them so that the hotspot provider receives a portion or a set amount for the amount of revenue that is provided to the telephone provider because of the access provided by the hotspot. Lastly, the telephone provider may also provide incentives for users that may be passed along to the user. Such incentives could be, for example, coupons to be found in the hotspot location for reduced cost for access or incentives to be passed along to the user through the advertising by the hotspot, as discussed above.

Also illustrated in FIG. 4 are examples of goods, services and data that are exchanged between the portable device user and either the wireless or landline telephone provider. Included among those may be user incentives, where the incentives could be directly sent to the user offering reduced costs or other inducements. For example, a user may receive such a message as a part of the user's download of data through their wireless telephone. Also, the telephone provider may also advertise the services for the hotspot location, providing locations of and services provided by the hotspot locations. As part of receiving access, the portable device user provides payment to the telephone provider, where the monitoring and billing of the access may be handled by the telephone provider. The telephone provider may also provide services directly, such as wireless telephone services and the telephone provider may also receive feedback about the user's experience with gaining and maintaining access to the larger network through the hotspot location.

The process of creating incentives for establishment of wireless hotspots, according to one embodiment, is illustrated in FIG. 4. The first step 401 calls for providing an access point for wireless devices to wireless connect to a larger network in a non-private location. It is noted that other embodiments of the present invention can provide an access point in a private location, but the incentives would be different since all of the users would need to have access to the private location to use the private location. After the access point is provided, users seeking to access services of the access point are required to submit an account identifier from a service provider, in step 402, such as a wireless telephone service provider. If the account identifier is authenticated, then the user is allowed access. It is noted that the account identifier may be a single datum, such as a telephone number, or may be a series of data, such as a telephone number, password, etc. or may be a series of responses to queries from an authenticating entity.

The use of the access point is monitored and the user is billed by the service provider for that usage, in step 403. This billing may be made on the basis of how much time the user spent logged on to the access point, may be based on the bandwidth used by the user, or may be billed based on another agreement between the user and the service provider. Additionally, incentives can be provided to the non-private location based on use of the access point, in step 404. The incentives could include discounted services for the proprietor of the non-private location or some form of payment back to the proprietor. Such incentives would depend on the use of the access point by the users so that the proprietor would have an incentive to advertise the services provided by the access point. This advertising can alert the users of special attributes of the hotspot that may match certain requirements of the user. Such attributes could include voice over IP, video streaming, or detail the expected bandwidth that a user of the hotspot should be able to use. As an example, a hotspot location could provide for rapid picture uploading and that specific service may be advertised to interested users. Additionally, the services offered by the hotspot locations may be bundled, so that users may select the type or service that they want to be authorized for.

In another embodiment of the present invention, a third party would act as an agent for the service provider and would create the incentive for establishing the hotspot locations. In this embodiment, the service provider, such as a wireless telephone provider 350 would have account information for the user in its database 352. The third party company 340 would act as a go-between and would maintain its own records of users in its own database 342. The benefit of the third party company in this embodiment of the present invention is that the company would provide the interface between the wireless hotspot and the service provider and would not require any direct interaction between the service provider and the wireless hotspot. Another benefit of the third party company embodiment is that users could supply account data for accounts they have with entities other than the wireless telephone service provider, such as a television cable company or an Internet service provider.

Figure 5:
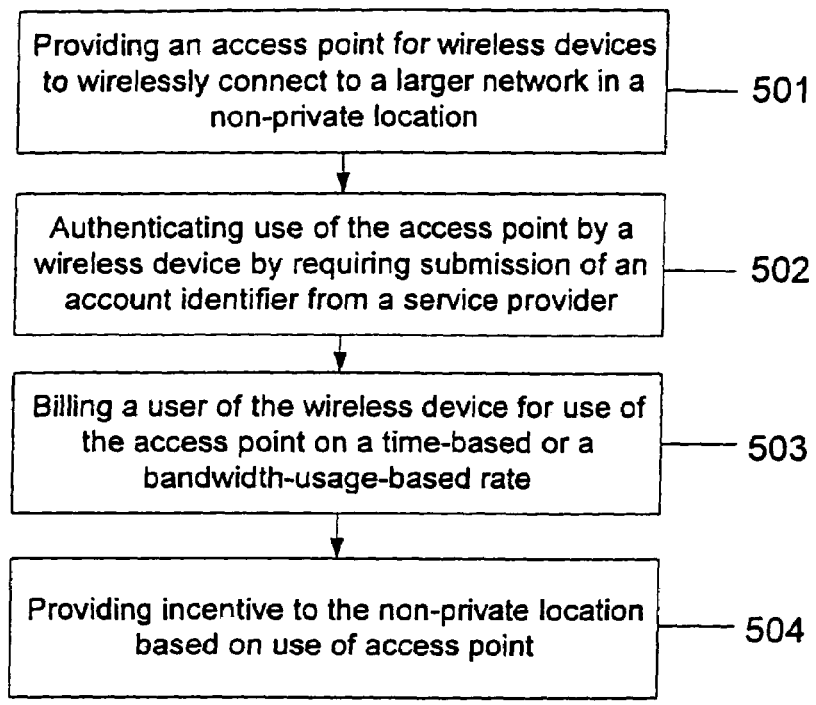
FIG. 5 illustrates a flowchart of the process of providing incentives for wireless access, according to an alternate embodiment of the present invention.

The process of creating incentives for establishment of wireless hotspots, according to the latter embodiment, is illustrated in FIG. 5. The first step 501 calls for providing an access point for wireless devices to wireless connect to a larger network in a non-private location. After the access point is provided, users seeking to access services of the access point are required to submit an account identifier from an appropriate entity, in step 502, such as a wireless telephone service provider or other service provider. If the account identifier is authenticated, then the user is allowed access. The use of the access point by the user is logged until the use of the access point is terminated, in step 503. After that, the information about the user's activities is provided to the service provider in a format that the service provider can use to bill the user.

Figure 6:
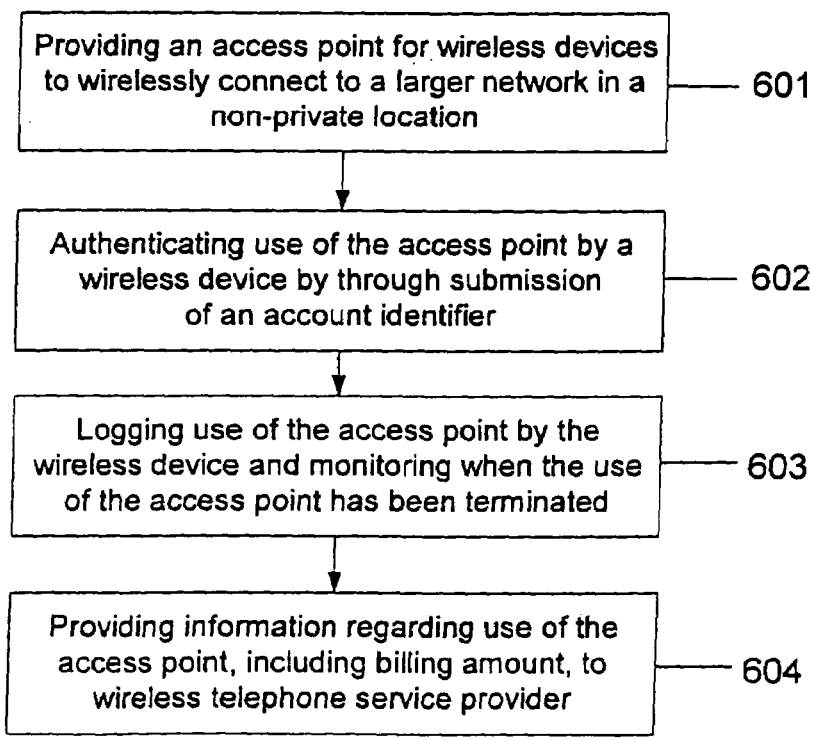
FIG. 6 illustrates a flowchart of the process of providing incentives for wireless access, according to another embodiment of the present invention.
Figure 7:
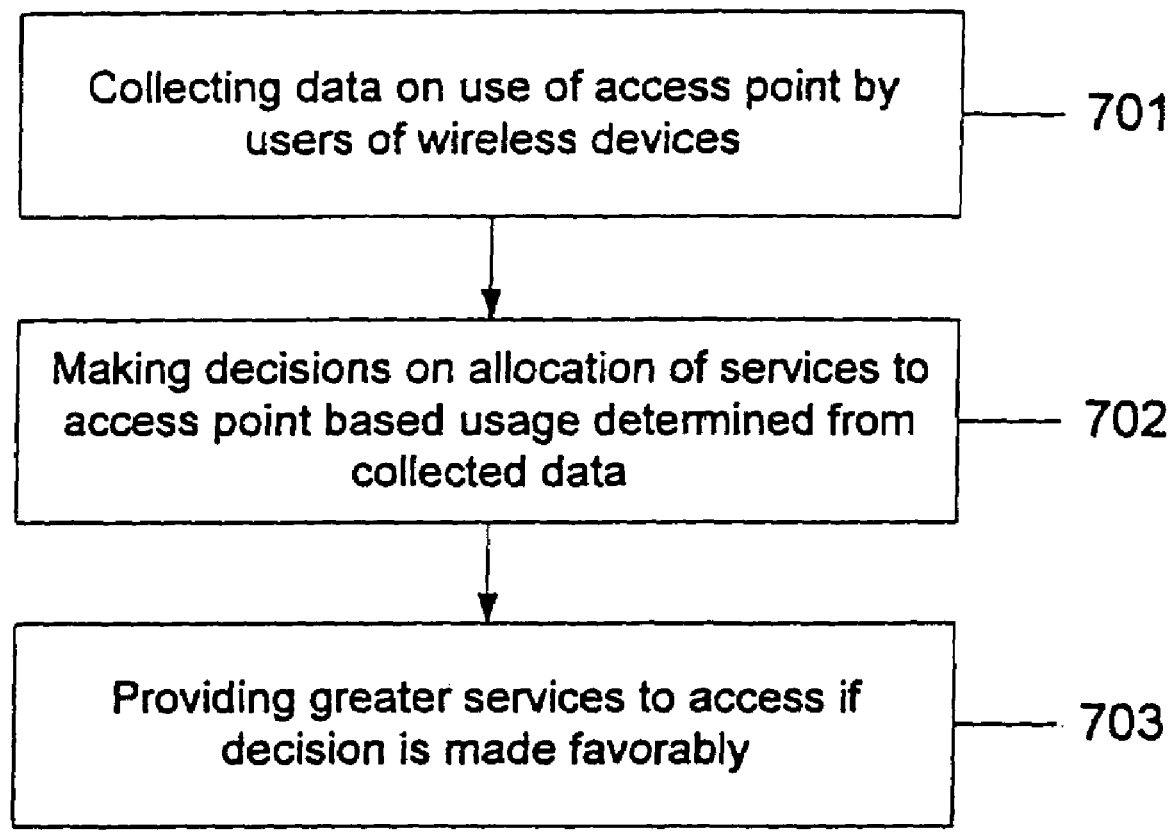
FIG. 7 illustrates a flowchart of the process of providing incentives for wireless access, according to one embodiment of this invention.

The present invention is also directed to monitoring and augmenting the services provided by the hotspots based on use. An example of the process is illustrated in FIG. 6. Data are collected on the use of the access point by the users of the wireless devices, in step 601 and that data is used to make allocation decisions, in step 602. Based on the allocation decision, greater services can be provided to the hotspot location when the decision is made favorably, in step 603. Thus, if an access point has a high usage and users are not fully able to use the services of the hotspot, then the access point can be provided with greater capacity. Such incentives would be in the interest of the service provider or third party company because it may allow for greater use and greater profitability of the hotspot location.

It is noted that the present application is directed, at least in part, to wireless hotspots. The use of the term wireless hotspot or hotspot is applicable to any wireless access point. The term wireless hotspot or hotspot, as used in the specification and claims, should not be construed to be limited to a single type of locale or be construed as providing access according to only a particular wireless access format, such as the IEEE 802.11 standard. It would also be within the scope of the invention to implement the disclosed elements of the invention in discrete electronic components, thereby taking advantage of the functional aspects of the invention. Additionally, the present invention can be implemented totally or partially through software.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A method of creating incentives for, a wireless hotspot in a publicly accessible location by a service provider, said method comprising:
evaluating use statistics of a wireless access point of the wireless hotspot by portable devices; and
providing an inducement to the publicly accessible location based on the evaluated use statistics.

2. A method as recited in claim 1, wherein said step of evaluating the use statistics of the access point comprises evaluating a number of users of the access point of the wireless hotspot.

3. A method as recited in claim 1, wherein said step of evaluating the use statistics of the access point comprises evaluating types of services utilized by users of the access point of the wireless hotspot.

4. A method as recited in claim 1, further comprising authenticating use of the access point for a portable device by requiring submission of an account identifier to one of a wireless telephone service provider and a landline telephone service provider.

5. A method as recited in claim 1, wherein said step of providing an inducement comprises providing a proprietor of the wireless hotspot with compensation based upon a portion of revenue received by the service provider based on generation of billing data for a user.

6. A method as recited in claim 1, wherein said step of providing an inducement comprises providing subsidized access to the access point of the wireless hotspot for selected users affiliated with the wireless hotspot.

7. A method as recited in claim 1, wherein said step of providing an inducement comprises advertising services available from the wireless hotspot to users of the access point of the wireless hotspot.

8. A method as recited in claim 7, wherein said step of advertising services comprises advertising services available for portable wireless devices by the wireless hotspot through the access point to users of the access point of the wireless hotspot.

9. A method as recited in claim 7, wherein said step of advertising services comprises advertising services available from the wireless hotspot to users of the access point of the wireless hotspot through a wireless telephone network.

10. A method as recited in claim 1, wherein said step of providing an inducement comprises upgrading equipment utilized by the access point.

11. A method as recited in claim 10, wherein said step of upgrading equipment utilized by the access point comprises providing equipment to the wireless hotspot to provide greater bandwidth access to portable devices accessing the access point.

12. A method as recited in claim 1, wherein providing an inducement comprises providing specialized content to the wireless hotspot.

13. A system for monitoring, a wireless hotspot in a publicly accessible location and creating incentives for, the wireless hotspot by a service provider, comprising:
evaluating means for evaluating use statistics of a wireless access point of the wireless hotspot by portable devices; and
providing means for providing an inducement to the publicly accessible location based on the evaluated use statistics.

14. A system as recited in claim 13, wherein said evaluating means comprises evaluating means for evaluating a number of users of the access point of the wireless hotspot.

15. A system as recited in claim 13, wherein said evaluating means comprises evaluating means for evaluating types of services utilized by users of the access point of the wireless hotspot.

16. A system as recited in claim 13, further comprising authenticating means for authenticating use of the access point for a portable device by requiring submission of an account identifier to one of a wireless telephone service provider and a landline telephone service provider.

17. A system as recited in claim 13, wherein said providing means comprises second providing means for providing a proprietor of the wireless hotspot with compensation based upon a portion of revenue received by the service provider based on generation of billing data for a user.

18. A system as recited in claim 13, wherein said providing means comprises second providing means for providing subsidized access to the access point of the wireless hotspot for selected users affiliated with the wireless hotspot.

19. A system as recited in claim 13, wherein said providing means comprises advertising means for advertising services available from the wireless hotspot to users of the access point of the wireless hotspot.

20. A system as recited in claim 19, wherein said advertising means comprises advertising means for advertising services available for portable wireless devices by the wireless hotspot through the access point to users of the access point of the wireless hotspot.

21. A system as recited in claim 19, wherein said advertising means comprises advertising means for advertising services available from the wireless hotspot to users of the access point of the wireless hotspot through a wireless telephone network.

22. A system as recited in claim 13, wherein said providing means comprises upgrading means for upgrading equipment utilized by the access point.

23. A system as recited in claim 22, wherein said upgrading means comprises a second providing means for providing equipment to the wireless hotspot to provide greater bandwidth access to portable devices accessing the access point.

24. A system as recited in claim 13, wherein said providing means comprises a second providing means for providing specialized content to the wireless hotspot.

25. A system for monitoring, a wireless hotspot in a publicly accessible location and creating incentives for, the wireless hotspot by a service provider, comprising:

evaluating means for evaluating use statistics of a wireless access point of the wireless hotspot by portables devices; and providing means for providing an inducement to the publicly accessible location based on the evaluated use statistics.

* * * * *